May 22, 1951  V. E. CARBONARA ET AL  2,554,010
MOUNT FOR PERISCOPIC SEXTANTS
Filed July 2, 1948  3 Sheets-Sheet 1
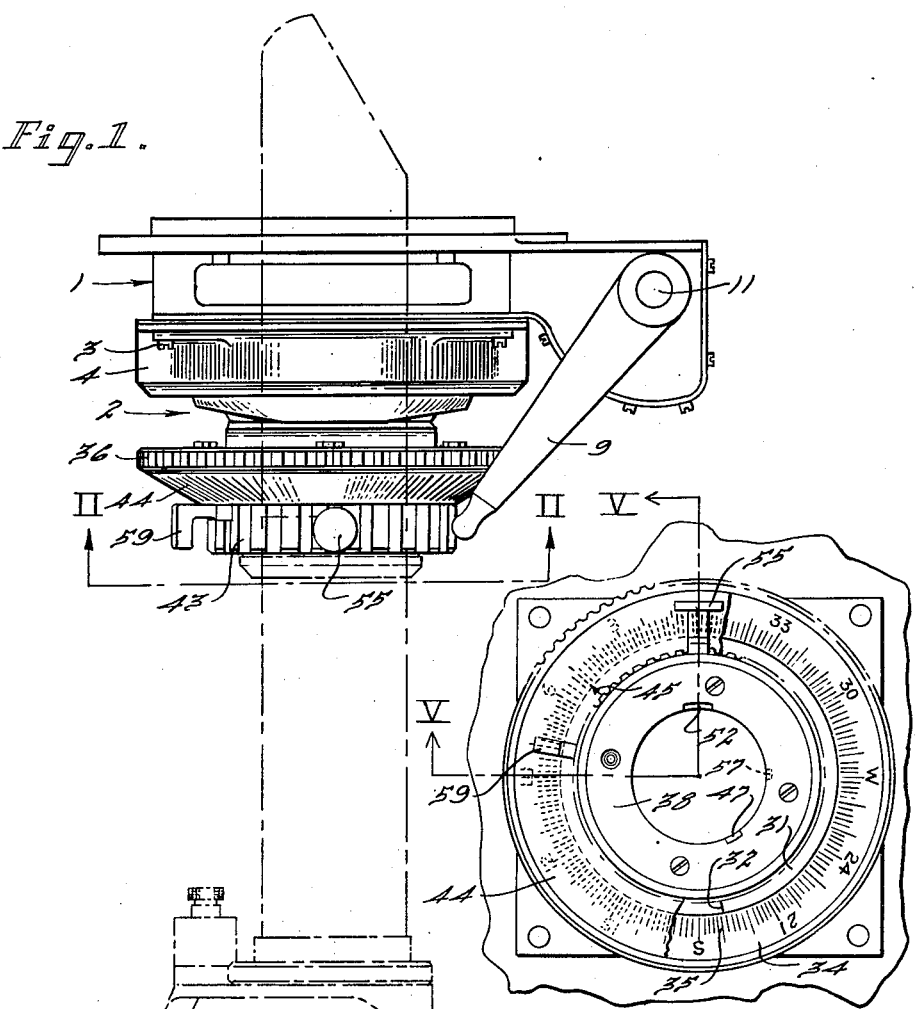
Fig.1.
Fig.2.
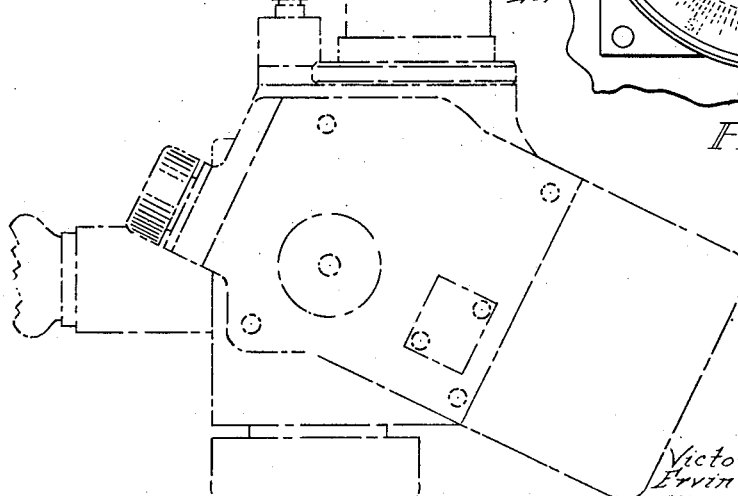
INVENTORS.
Victor E. Carbonara.
Ervin Douglas MacDonald
BY
ATTORNEY.

INVENTORS.
Victor E. Carbonara.
Ervin Douglas MacDonald.
BY
Myron J. Seibold
ATTORNEY.

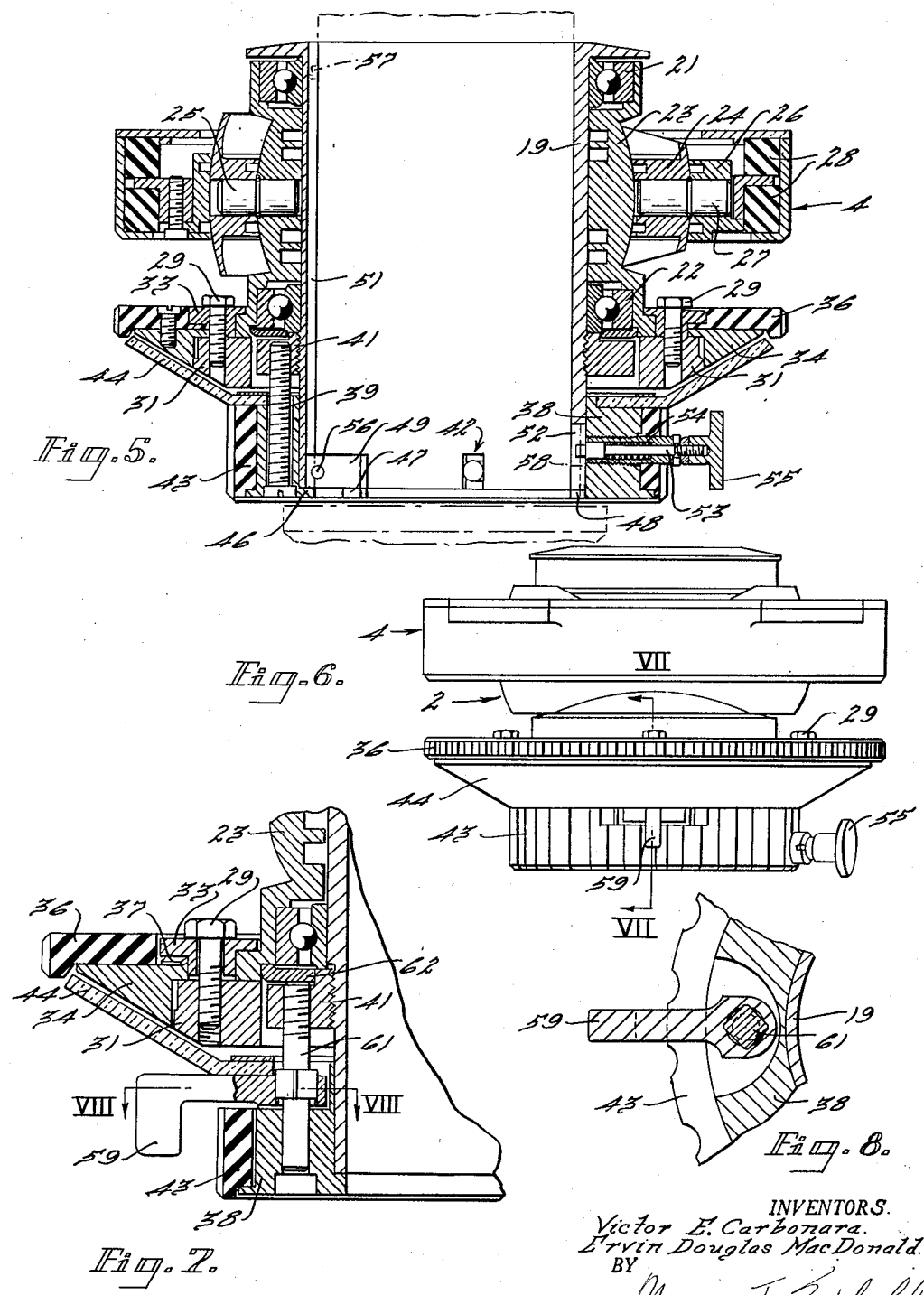

Patented May 22, 1951

2,554,010

UNITED STATES PATENT OFFICE 2,554,010

MOUNT FOR PERISCOPIC SEXTANTS

Victor E. Carbonara, Manhasset, and Ervin Douglas MacDonald, East Williston, N. Y., assignors, by mesne assignments, to Kollsman Instrument Corporation, Elmhurst, N. Y., a corporation of New York Application July 2, 1948, Serial No. 36,608

7 Claims. (Cl. 33—69)

1

This invention relates to a mount for a periscopic sextant particularly adapted for use in aircraft wherein the sextant is projected through the aircraft skin and eliminates the transparent astrodome and hand held sextant.

An object of the invention is to provide a mount for a periscopic sextant providing means for locking the sextant in a retracted position so as to prevent accidental release by which the instrument could be injured in a fall and also to permit holding of the sextant in the mount but in a retracted position.

Another object of the invention is a mount for a periscopic sextant which will facilitate the insertion of the sextant within the mount and its projection through the aircraft skin without substantial loss of cabin air in a pressurized aircraft.

Another object of the invention is a mount for a periscopic sextant which will permit not only rotation of the sextant about the longitudinal axis of the periscope but also universal tilting of the instrument through a limited arc.

Another object of the invention is the provision of a mount for a periscopic sextant in which the sextant is indexed within the mount with respect to the longitudinal axis of the aircraft and an azimuth scale so as to give the azimuth reading of the line of sight of the sextant.

Another object of the invention is a mount for a periscopic sextant which provides for the presetting of a computed azimuth for the line of sight of the sextant in conjunction of the azimuth of the true aircraft heading or, conversely, the use of the azimuth angle of a celestial body to check the aircraft compass and its heading.

Other objects and features of the invention will be readily apparent to those skilled in the art from the specification and appended drawings illustrating certain preferred embodiments in which:

Figure 1 is an elevational view of a mount for a periscopic sextant according to the present invention including the shutter assembly and showing the projected sextant in broken lines.

Figure 2 is a bottom plan view of the mount on the line II—II of Figure 1.

Figure 5 is a sectional view through the seat

2 portion of the sextant mount, the view being taken on right angle planes V—V of Figure 2 to show the gimbal ring arrangement.

Figure 6 is an elevational view of the seat portion of the sextant mount.

Figure 7 is an enlarged detailed sectional view of the mechanism for locking the instrument against rotation and taken on the line VII—VII of Figure 6.

Figure 8 is a detailed view on the line VIII—VIII of Figure 7.

The periscopic sextant mount according to this invention comprises a shutter assembly housing indicated generally at 1 and an instrument seat indicated generally at 2. The shutter housing and instrument seat are connected together as by studs 3 directed through flanges upon a stationary mounting ring 4.

Figure 3:
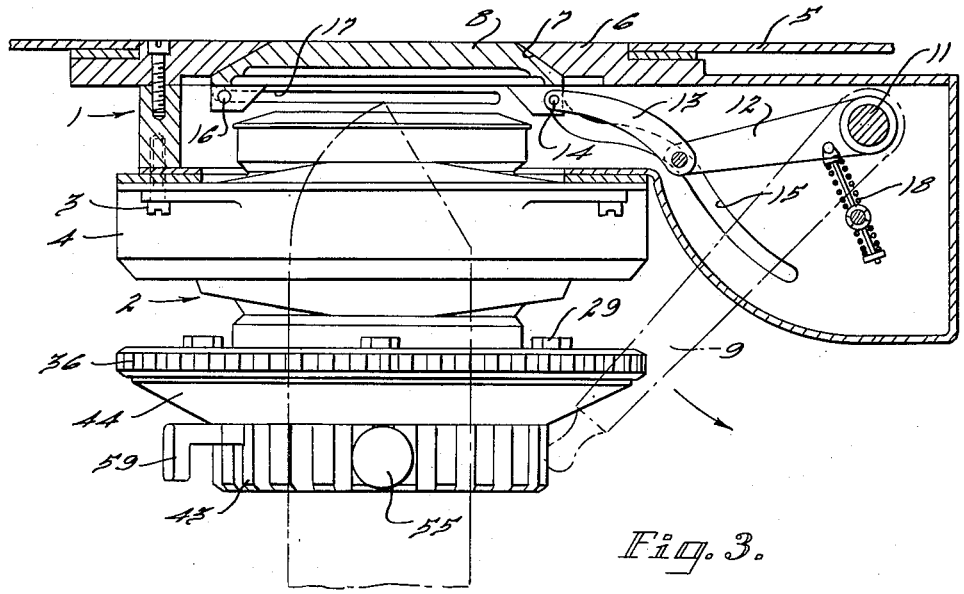
Figure 3 is a view showing the shutter assembly in section and the sextant seat in elevation and with the sextant indicated in broken lines in retracted but mounted position.
Figure 4:
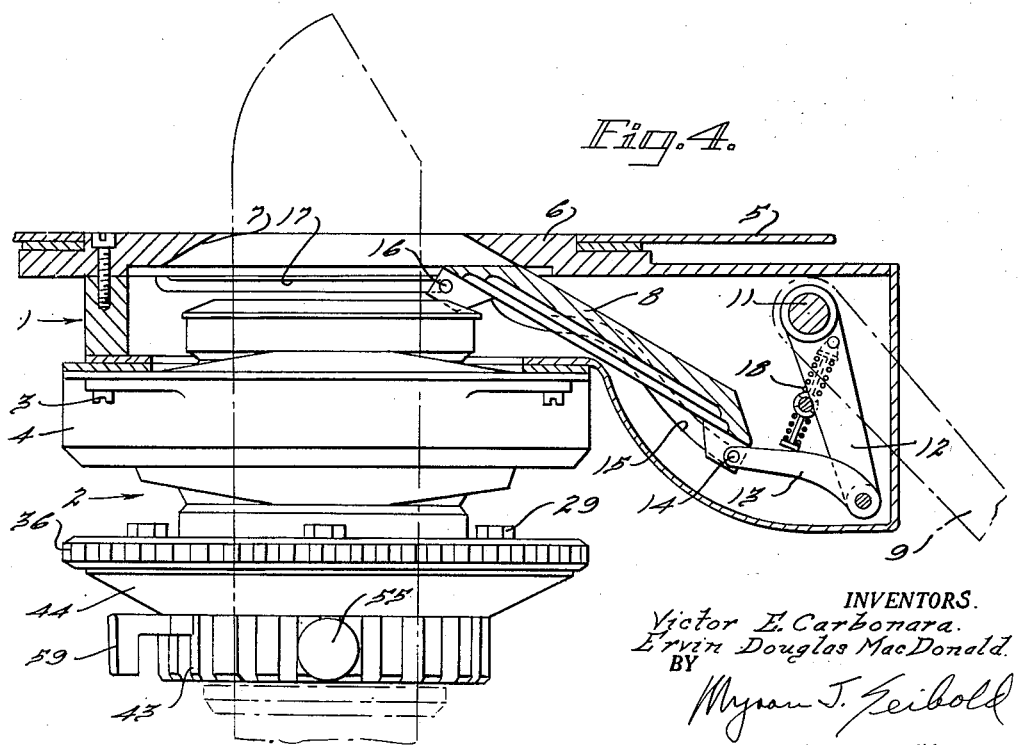
Figure 4 is a view similar to Figure 3 but showing the shutter open and the sextant in its projected position.

As shown in Figures 3 and 4, the shutter housing is connected by suitable screws, not shown, to the outer skin 5 of an aircraft. The shutter housing includes a top wall 6 provided with an opening 7 adapted to be closed by a shutter 8 and through which the end of the tube of the periscopic sextant projects. At the exterior of the housing, there is provided a manual operating handle 9 mounted on a shaft 11 pivoted in the opposite side walls of the housing. Upon the shaft 11 there is mounted an internal lever 12 connected through a link 13 to the shutter 8. The shaft 14 pivotally connecting the link 13 to the shutter 8 has end portions riding in suitable guide slots 15 in the opposite side walls of the shutter housing. Similarly, the left hand side of the shutter, as shown in Figures 3 and 4, is provided with a shaft or pin 16 riding in guide slots 17 in the opposite side walls of the housing. An over-center spring arrangement 18 serves to hold the shutter in its extreme closed and open positions.

The operation of the shutter will be readily apparent from an inspection of Figures 3 and 4 as rotation of the operating handle 9 in a counterclockwise direction from the position of Figure 3 to that of Figure 4 will move the shutter 8 from its Figure 3 position, closing the opening 7, into its open Figure 4 position, the over-center spring 18 serving to maintain the parts in either of these extreme positions in which they are manually placed.

The seat portion of the sextant mount will be best understood from an inspection of Figure 5 of the drawing. The tube portion of the periscopic sextant is adapted to be disposed through a sleeve 19 rotatably mounted by bearings 21 and 22 within a ring 23. Outside of the ring 23 is a second ring 24 pivoted thereto by oppositely disposed trunnions 25, of which one only is shown in Figure 5, the trunnions 25 thereby providing for rotation of the ring 24 about the ring 23 in one plane. At the outside of the ring 24 is a third ring 26 pivotally secured to the ring 24 by a pair of oppositely directed trunnions 27, of which one only is shown in Figure 5, with the trunnions 27 disposed in a plane at 90° with respect to the plane of trunnions 25. The ring 26 is shock mounted by cushion washers 28 within the stationary mounting ring 4. With the ring and trunnion arrangement above described, it is seen that there is provided a gimbal mounting for the sleeve 19 permitting universal tilting thereof and of the instrument therein in all directions through a limited arc. A series of internal annular grooves are provided in the inner surfaces of the gimbal rings, as shown in Figure 5, in order to reduce the air leakage between adjacent gimbal rings.

Mounted at the lower portion of the ring 23, by means of studs 29, is a rotatably adjustable ring 31 carrying a datum index line 32 (Figure 2). The ring 31 is clamped in its adjusted position by means of the studs 29 and the clamping ring 33. Outside of the ring 31 bearing the datum index line is a rotatable ring 34 bearing azimuth indicia 35. Connected to the azimuth ring 34 is a knurled ring 36 for manually rotating the azimuth ring. The azimuth ring 34 has a spring slip connection at 37 (Figure 7) with respect to the clamping ring 33 so as to be freely rotatable at will regardless of the clamping of the datum index line ring 31. At the bottom of the seat there is provided a rotatable ring 38 rigidly mounted to the sleeve 19 by means of studs 39 threading into a ring 41 threaded on the outside of the sleeve 19, the ring 38 and sleeve 19 being indexed by the pin and slot connection shown at 42. At the outside of the ring 38 is a knurled gripping portion 43 and rigidly connected to the ring 38 is a transparent shield 44 bearing a lubber line indicated at 45 in Figure 2.

The bottom of the ring 38 is provided with a circular flange 46 having cut therethrough a pair of slots 47 and 48. The slot 47 communicates with an annular cut out porton 49 in the bottom of the sleeve 19 and this in turn communicates with an elongated groove 51 in the interior wall of the sleeve 19, the groove 51 being spaced a substantal angular distance from the slot 47. Above the slot 48 the sleeve 19 is provided with a mating slot 52 into which projects the end of a locking pin 53 biased inwardly by a spring 54 and provided with a manual handle 55 for retracting the pin. Adjacent the groove 51 and within the annular cutout portion 49 there is provided a second locking device 56 which may be a duplicate of the locking pin 53 or may be a simple spring pressed ball.

As shown in broken lines in Figure 5, the sextant is in its projected position with a pin 57 rigid with the periscopic tube shown disposed adjacent the upper end of the groove 51 in sleeve 19. Within the cutout portion 52 in the sleeve 19, there is shown in broken lines a locking and index plate 58 rigid with the periscopic tube and into which the end of the locking pin 53 projects.

Referring to Figures 7 and 8, there is shown means for locking the sleeve 19 and the instrument therein against rotation, this locking means comprising a manual handle 59 mounted upon a rotatable shaft 61 which is threaded in a ring 41. Above the shaft 61 is a slip spring ring 62 between the ring 41 and the bottom part of the ring 23. As the handle 59 is rotated to rotate shaft 61, the shaft 61 will be moved longitudinally into engagement with the ring 62 and will hence lock the sleeve 19, ring 41 and ring 38 to the ring 23 which is held against rotation about the longitudinal axis of the instrument although it may still tilt in its gimbal mounting.

The operation of the mount will now be described. A suitable opening is cut in the skin of the aircraft and the plate 6 of the shutter housing connected thereto by screws. The seat portion of the mount may remain connected to the shutter housing during this mounting in the aircraft. In view of the fact that the datum index mark 32 is adjustable, it is unnecessary to align any portion of the mount with the longitudinal axis of the aircraft in its initial mounting on the skin. The datum index mark should then be aligned with the longitudinal axis of the aircraft and this will be a permanent adjustment since it need be done but once for any mount installation. In adjusting the position of the datum index mark, the sextant is inserted into the mount, as will be hereinafter described, and the sextant is then aligned with the longitudinal axis of the aircraft. This positions the lubber line 45 parallel with the longitudinal aircraft axis. Thereafter, the four screws 29 are loosened and the ring 31 is rotated until the datum index line 32 is coincident with the lubber line (the sextant being still aligned with the longitudinal axis of the aircraft). The screws 29 are then tightened to lock the ring 31 in position and this permanently adjusts the datum index line in alignment with the longitudinal axis of the aircraft.

In inserting the periscopic sextant into the mount, the pin 57 is passed through the slot 47 and the ring 38 rotated until locking means 56 passes over the pin 57. If a locking pin as 53 is used, it will be manually retracted and if a spring pressed ball is used for the locking means 56, a simple rotation of the ring will move it past the pin 57 on the periscope tube. After this operation, the sextant is locked in its retracted position and it may be left in this position indefinitely, if desired, since it is held in position by engagement of the pin 57 with the flange 46. With the periscope in the mount in retracted position, the shutter 8 is opened by rotation of the handle 9 as indicated in Figures 3 and 4. Thereafter, the periscope will be moved upwardly into its projected position with the pin 57 passing up the groove 51 in the sleeve 19 and the locking plate 58 entering the slot 52 in the sleeve 19 and interlocking with the pin 53 to lock the sextant in its projected position. In its projected position, the sextant may be turned about its longitudinal axis by rotation of the sleeve 19 and it may be tilted in the gimbal mounting of the sleeve. The vertical rotation of the angle of sight of the sextant will, of course, be a matter of its internal construction, a sextant of this type being shown in the copending application of Victor E. Carbonara, Serial No. 33,345 filed June 16, 1948, entitled Periscopic Sextant.

To remove the sextant from its mount, the operation is the reverse of that described for its insertion. The locking pin 53 must be retracted to permit the sextant to be lowered until the pin 57 engages the flange 46. Thereafter, the shutter 8 should be closed and the sextant rotated until the pin 57 again registers with the slot 47, whereupon the instrument can be bodily removed. It will be seen that with the flange 46, pin 57 and the locking means 56, it is impossible for the sextant to accidentally fall from its mount if the locking pin 53 is retracted, and, furthermore, that when in retracted position it will be maintained therein until it is deliberately removed by manual manipulation.

If the sextant is inserted into the mount in retracted position before the shutter 8 is opened, it will be seen that there will be a minimum loss of cabin air from a pressurized cabin when the sextant is placed in its projected position. It will also be noted that the gimbal rings are provided with annular grooves to minimize loss of air thereabout.

One feature of the mount according to this invention lies in the means for placing the sextant in position for observation of a celestial body without the necessity of scanning the sky and also for checking the aircraft compass and heading from observations of a celestial body.

The azimuth and altitude angles for the anticipated time of a future observation may be computed, the altitude angle set in the sextant, and the azimuth dial 34, 35 rotated so that the fixed datum index line 32 indicates on the azimuth dial the aircraft heading with respect to true north, which will be the compass heading corrected for deviation and variation. Then, if the sextant is rotated to place the lubber line 45 upon the azimuth scale 35 at the computed value, the celestial body to be observed should be within the field of view at the time of observation. This facilitates locating the celestial body in the optical field by eliminating unnecessary scanning of the sky.

The true heading of the aircraft can be determined with the azimuth scale when it is used in conjunction with the procedure of taking altitude angle bearings of celestial bodies to determine a fix by lines of position, the true heading thus determined providing a check on the compass. The sextant is directed to a star whose azimuth angle is determined from tables in conventional manner. The sextant is then locked in this position. The azimuth dial 34, 35 is rotated until the azimuth of the star appears opposite the lubber line 45. The true heading of the aircraft is then indicated opposite the datum index line 32. The difference between this indication, corrected for variation, and the compass indication will be the compass deviation.

It will also be apparent that the azimuth scale will provide means for identifying an unknown star since its azimuth may be determined from the reading of the azimuth scale opposite the lubber line 45 when the true aircraft heading is set at the datum index line 32.

While certain preferred embodiments of the invention have been specifically disclosed, it is understood that the invention is not limited thereto, as many variations will be readily apparent to those skilled in the art and the invention is to be given its broadest possible interpretation within the terms of the following claims:

What is claimed is:

1. In a mount for a periscopic sextant for aircraft, a stationary mount adapted to be connected to the aircraft skin under an opening therein, a movable shutter in said mount normally closing said opening, a rotatable sleeve in said mount aligned with said opening and adapted to receive the periscopic tube of the sextant, means for locking the sextant tube within the sleeve but in retracted position beneath the shutter, means for opening the shutter, and means for locking and indexing the periscopic tube with respect to the sleeve in extended position projecting through the skin opening.

2. In a mount for a periscopic sextant for aircraft, a stationary mount adapted to be connected to the aircraft skin under an opening therein, a movable shutter in said mount normally closing said opening, a rotatable sleeve in said mount aligned with said opening and adapted to receive the periscopic tube of the sextant, means for locking the sextant tube within the sleeve but in retracted position beneath the shutter, means for opening the shutter, and means for locking and indexing the periscopic tube with respect to the sleeve in extended position projecting through the skin opening, said means for locking the periscope in retracted position including pin and slot connections requiring relative rotation of the sleeve and periscope tube before the tube is in a position to be projected.

3. In a mount for a periscopic sextant for aircraft, a stationary mount adapted to be connected to the aircraft skin under an opening therein, a movable shutter in said mount normally closing said opening, a rotatable sleeve in said mount aligned with said opening and adapted to receive the periscopic tube of the sextant, means for locking the sextant tube within the sleeve but in retracted position beneath the shutter, means for opening the shutter, and means for locking and indexing the periscopic tube with respect to the sleeve in extended position projecting through the skin opening, means for releasing the periscopic tube from its locked projected position whereby the tube may be moved into retracted position, and interlocking means preventing further removal of the sextant until the sleeve and tube have been rotated relatively.

4. In a mount for a periscopic sextant for aircraft, a stationary mount adapted to be connected to the aircraft skin under an opening therein, a movable shutter in said mount normally closing said opening, a rotatable sleeve in said mount aligned with said opening and adapted to receive the periscopic tube of the sextant, means for locking the sextant tube within the sleeve but in retracted position beneath the shutter, means for opening the shutter, and means for locking and indexing the periscopic tube with respect to the sleeve in extended position projecting through the skin opening, said means for locking the periscope in retracted position including pin and slot connections requiring relative rotation of the sleeve and periscope tube before the tube is in a position to be projected and means for restraining the sleeve and periscopic tube against rotation when in retracted position so as to prevent accidental release of the tube and sextant.

5. In a mount for a periscopic sextant for aircraft, a stationary mount adapted to be connected to the aircraft skin under an opening therein, a movable shutter in said mount normally closing said opening, a rotatable sleeve in said mount aligned with said opening and adapted to receive the periscopic tube of the sextant, means for locking the sextant tube within the sleeve but in retracted position beneath the shutter, means for opening the shutter, and means for locking and indexing the periscopic tube with respect to the sleeve in extended position projecting through the skin opening, a datum index line on said mount, an azimuth ring on said mount and freely rotatable relative thereto and carrying azimuth indicia thereon, and a lubber line connected to said sleeve and rotatable therewith, the azimuth indicia being positioned to be read with respect to both said datum index and lubber lines, said means for locking the periscope in retracted position including pin and slot connections requiring relative rotation of the sleeve and periscope tube before the tube is in a position to be projected.

6. In a mount for a periscopic sextant for aircraft, a stationary mount adapted to be connected to the aircraft skin under an opening therein, a movable shutter in said mount normally closing said opening, a rotatable sleeve in said mount aligned with said opening and adapted to receive the periscopic tube of the sextant, means for locking the sextant tube within the sleeve but in retracted position beneath the shutter, means for opening the shutter, and means for locking and indexing the periscopic tube with respect to the sleeve in extended position projecting through the skin opening, a pair of rings carried by said mount at the exterior of said sleeve, a datum index line on one of said rings, means for adjustably locking said one ring in indexed normally non-rotatable position, azimuth indicia on the second of said rings, the second of said rings being mounted to be freely rotatable with respect to said mount and datum index line ring, and a lubber line connected to said sleeve so as to be rotatable therewith, the azimuth indicia being positioned to be read with respect to both said datum index and lubber lines, means for releasing the periscopic tube from its locked projected position whereby the tube may be moved into retracted position and interlocking means preventing further removal of the sextant until the sleeve and tube have been rotated relatively.

7. In a mount for a periscopic sextant for aircraft, a stationary mount adapted to be connected to the aircraft skin under an opening therein, a movable shutter in said mount normally closing said opening, a rotatable sleeve in said mount aligned with said opening and adapted to receive the periscopic tube of the sextant, means for locking the sextant tube within the sleeve but in retracted position beneath the shutter, means for opening the shutter, and means for locking and indexing the periscopic tube with respect to the sleeve in extended position projecting through the skin opening, a pair of rings carried by said mount at the exterior of said sleeve, a datum index line on one of said rings, means for adjustably locking said one ring in indexed normally non-rotatable position, azimuth indicia on the second of said rings, the second of said rings being mounted to be freely rotatable with respect to said mount and datum index line ring, a lubber line connected to said sleeve so as to be rotatable therewith, the azimuth indicia being positioned to be read with respect to said both datum index and lubber lines, means for locking the rotatable sleeve at will in any position, said means for locking the periscope in retracted position including pin and slot connections requiring relative rotation of the sleeve and periscopic tube before the tube is in a position to be projected and means for restraining the sleeve and periscopic tube against rotation when in retracted position so as to prevent accidental release of the tube and sextant.

VICTOR E. CARBONARA.
ERVIN DOUGLAS MacDONALD.

REFERENCES CITED

The following references are of record in the file of this patent:

UNITED STATES PATENTS

| Number | Name | Date |
|---|---|---|
| 867,982 | Lake | Oct. 15, 1907 |
| 1,341,683 | Styll | June 1, 1920 |
| 2,037,162 | Gent | Apr. 14, 1936 |
| 2,389,852 | Hagner | Nov. 27, 1945 |